United States Patent
Sithebe

(10) Patent No.: US 8,485,284 B2
(45) Date of Patent: Jul. 16, 2013

(54) METHOD FOR PRODUCING A PCD COMPACT

(75) Inventor: Humphrey Samkelo Lungisani Sithebe, Springs (ZA)

(73) Assignee: Element Six Abrasives S.A., Luxembourg (LU)

( * ) Notice: Subject to any disclaimer, the term of this patent is extended or adjusted under 35 U.S.C. 154(b) by 148 days.

(21) Appl. No.: 12/995,370

(22) PCT Filed: Jun. 3, 2009

(86) PCT No.: PCT/IB2009/052344
§ 371 (c)(1),
(2), (4) Date: Nov. 30, 2010

(87) PCT Pub. No.: WO2009/147629
PCT Pub. Date: Dec. 10, 2009

(65) Prior Publication Data
US 2011/0072730 A1    Mar. 31, 2011

(30) Foreign Application Priority Data
Jun. 4, 2008    (GB) .................................. 0810184.2

(51) Int. Cl.
*E21B 10/46* (2006.01)
*E21B 10/567* (2006.01)

(52) U.S. Cl.
USPC ........................................... 175/434; 51/309

(58) Field of Classification Search
USPC ............. 175/426, 434, 428; 428/408; 51/309
See application file for complete search history.

(56) References Cited

U.S. PATENT DOCUMENTS

| 4,224,380 A | 9/1980 | Bovenkerk et al. |
| 4,288,248 A | 9/1981 | Bovenkerk et al. |
| 4,871,377 A | 10/1989 | Frushour |
| 4,944,772 A | 7/1990 | Cho |
| 5,127,923 A | 7/1992 | Bunting et al. |
| 6,544,308 B2 | 4/2003 | Griffin et al. |
| 6,562,462 B2 | 5/2003 | Griffin et al. |
| 2005/0210755 A1* | 9/2005 | Cho et al. .................. 51/293 |

FOREIGN PATENT DOCUMENTS

| JP | 59-219500 A | 12/1984 |
| JP | 62-057872 A | 3/1987 |
| JP | 2-1999072 A | 8/1990 |
| JP | 6-339735 A | 12/1994 |
| JP | 7-132465 A | 5/1995 |
| JP | 2007-153666 A | 6/2007 |

* cited by examiner

*Primary Examiner* — Pegah Parvini
(74) *Attorney, Agent, or Firm* — Frommer Lawrence & Haug LLP; Ronald R. Santucci

(57) ABSTRACT

A method of producing a composite diamond compact comprising a polycrystalline diamond (PCD) compact bonded to a cemented carbide substrate is provided. The method includes the steps of: providing a PCD table, preferably a PCD table with diamond-to-diamond bonding and a porous microstructure in which the pores are empty of second phase material bringing together the PCD table and a cemented carbide substrate in the presence of a bonding agent to form an unbonded assembly; subjecting the unbonded assembly to an initial compaction at a pressure of at least 4.5 GPa and a temperature below the melting point of the bonding agent for a period of at least 150 seconds; and thereafter subjecting the unbonded assembly to a temperature above the melting point of the bonding agent and a pressure of at least 4.5 GPa for a time sufficient for the bonding agent to become molten and bond the PCD table to the substrate to form a composite diamond compact.

12 Claims, 4 Drawing Sheets

METHOD FOR PRODUCING A PCD COMPACT

This application is a 371 of PCT/IB2009/052344 filed on Jun. 3, 2009, published on Dec. 10, 2009 under publication number WO 2009/147629 A and claims priority benefits of British Patent Application Number 0810184.2 filed Jun. 4, 2008, the disclosure of which is incorporated herein by reference.

BACKGROUND OF THE INVENTION

This invention relates to the manufacture of polycrystalline diamond (PCD) materials.

Polycrystalline diamond, also known as a diamond abrasive compact, comprises a mass of diamond particles containing a substantial amount of direct diamond-to-diamond bonding. Polycrystalline diamond will generally have a second phase which contains a diamond catalyst/solvent such as cobalt, nickel, iron or an alloy containing one or more such metals.

When diamond particles are combined with a suitable metallic solvent/catalyst, this solvent/catalyst promotes diamond-to-diamond bonding between the diamond grains, resulting in an intergrown or sintered structure. This intergrown diamond structure therefore comprises original diamond grains as well as newly precipitated or re-grown diamond phase, which bridges these original grains. In the final sintered structure, solvent/catalyst material remains present within the interstices that exist between the sintered diamond grains. The sintered PCD has sufficient wear resistance and hardness for use in aggressive wear, cutting and drilling applications.

A well-known problem experienced with this type of PCD compact, however, is that the residual presence of solvent/catalyst material in the microstructural interstices has a detrimental effect on the performance of the compact at high temperatures. This decrease in performance under thermally demanding conditions is postulated to arise from two different behaviours of the metallic-diamond compact.

The first arises from differences between the thermal expansion characteristics of the interstitial solvent/catalyst and the sintered diamond network. At temperatures much greater than 400° C., the metallic component expands far more than the intergrown diamond network and can generate micro-fracturing of the diamond skeleton. This micro-fracturing significantly reduces the strength of the bonded diamond at increased temperatures.

Additionally, the solvent/catalyst metallic materials which facilitate diamond-to-diamond bonding under high-pressure, high-temperature sintering conditions can equally catalyse the reversion of diamond to graphite at increased temperatures and reduced pressure with obvious performance consequences. This particular effect is mostly observed at temperatures in excess of approximately 700° C.

As a result. PCD sintered in the presence of a metallic solvent/catalyst, notwithstanding its superior abrasion and strength characteristics, must be kept at temperatures below 700° C. This significantly limits the potential industrial applications for this material and the potential fabrication routes that can be used.

Potential solutions to this problem are well-known in the art.

One key approach is to remove the catalyst/solvent or binder phase from the PCD material, either in the bulk of the PCD layer or in a volume adjacent to the working surface of the PCD tool (where the working surface typically sees the highest temperatures in the application because of friction events).

U.S. Pat. Nos. 4,224,380 and 4,288,248 describe polycrystalline diamond compacts, initially sintered in the presence of metallic catalyst/solvents, where a substantial quantity of this catalyst/solvent phase has been leached from the diamond network. This leached product has been demonstrated to be more thermally stable than the unleached product.

There are several problems that result from this approach to achieving improved thermal stability. Firstly, these leached PCD pieces with their continuous network of empty pores possess a substantially increased surface area, which can result in increased vulnerability to oxidation (particularly at higher temperatures). This can then result in reduced strength of the PCD compact at high temperatures, albeit via a different mechanism. Porous leached PCD compacts of this type also suffer from technical attachment problems, in that they must still be brazed to a carbide substrate prior to use. Conventional PCD compacts are typically generated with the carbide substrate attached following the sintering step. This brazing step is technically challenging and often provides a subsequent weak point within the compact tool structure.

U.S. Pat. No. 4,944,772 discloses the formation of a bi-layered sintered PCD compact which has a top layer that is preferably thermally-stable. In one preferred embodiment, a leached PCD compact and a cemented carbide support are separately formed. An interlayer of unsintered diamond crystals (having a largest dimension of 30-500 μm) is placed between the carbide and thermally stable PCD (TSPCD) layer. A source of catalyst/sintering aid material is also provided in association with this layer of interposed crystals. This assembly is then subjected to HpHT conditions, sintering the interlayer and bonding the whole into a bi-layered supported compact. In this application, appreciable re-infiltration of the TSPCD layer is not seen as advantageous, but the requirement for some small degree of reinfiltration is recognised in order to achieve good bonding.

U.S. Pat. No. 5,127,923 teaches an improvement on this approach, where a porous thermally stable polycrystalline diamond (TSPCD) layer is reattached to a carbide substrate during a second HpHT cycle, with the provision of a second "inert" infiltrant source adjacent a surface of the TSPCD compact removed from the substrate. Infiltration of the TSPCD body with this second infiltrant prevents significant re-infiltration by the metallic binder of the carbide substrate. Where carefully chosen, it does not compromise the thermal stability of the previously leached body. A suitable infiltrant, such as silicon, for example, must have a melting point lower than that of the substrate binder.

It has been observed that compacts generated according to these teachings experiences high internal stresses because of the significant differences in properties between the leached/porous layer and the underlying sintered PCD and carbide substrate. This is exacerbated by the monolithic nature of the leached compact and often causes cracking at the PCD-substrate interface or through the PCD layer itself during the second attachment HpHT cycle. Furthermore, the reattachment process itself can be difficult to control such that appreciable re-infiltration of the TSPCD layer does not occur during the second HpHT cycle Additionally, a further factor of concern is in the provision of the leached or porous TSPCD compact required. Typically, it is extremely difficult and time-consuming to effectively remove the bulk of the metallic binder from the finer-grained and thicker PCD tables required by current applications. In general, the current art is typically focussed on achieving PCD of high diamond density and commensurately PCD that has an extremely fine distribution of metal binder pools. This fine network resists penetration by the leaching agents, such that residual catalyst/solvent often remains behind in the leached compact, compromising its eventual thermal stability. Furthermore, achieving appreciable leaching depths can take so long as to be commercially unfeasible or require undesirable interventions, such as extreme acid treatments or the drilling of penetration channels into the bulk PCD, for example.

A further approach disclosed in the art pertains to the partial removal of the metallic binder from the PCD compact. JP 59219500 claims an improvement in the performance of PCD sintered materials after a chemical treatment of the working surface. This treatment dissolves and removes the catalyst/solvent matrix in an area immediately adjacent to the working surface. The invention is claimed to increase the thermal resistance of the PCD material in the region where the matrix has been removed without compromising the strength of the sintered diamond.

U.S. Pat. Nos. 6,544,308 and 6,562,462 disclose PCD cutting elements that are characterised inter alia by a region adjacent the cutting surface which is substantially free of catalysing material. The improvement of performance of these cutters is ascribed to an increase in wear resistance of the PCD in this area, where the removal of the catalyst material results in decreased thermal degradation of the PCD in the application.

Whilst substantial removal of the catalyst/solvent in this region to a depth of approximately 200-500 μm from the working surface does observably improve the performance of the cutting element in specific applications, certain problems are still experienced. As this approach is typically applied to a full cutting element i.e. with carbide substrate attached; the vulnerable substrate and PCD-substrate interface have to be masked or protected during the metal removal or leaching step. This masking process is not technically trivial and further limits the range of leaching treatments that can be employed without causing significant damage to the portions of the cutter that must be protected.

There is a further technical limitation inherent in this approach. The PCD layer is manufactured in situ on the carbide substrate and subsequently treated while attached thereto. Hence, the nature and type of the carbide substrate is restricted to that which is supportive of the infiltration and PCD sintering process. This restricts the optimisation of the mechanical properties of the substrate, to those which are coupled to suitable infiltration properties.

SUMMARY OF THE INVENTION

According to the invention there is provided a method of producing a composite diamond compact comprising a polycrystalline diamond (PCD) compact bonded to a cemented carbide substrate including the steps of:
  providing a PCD table
  bringing together the PCD table and a cemented carbide substrate in the presence of a bonding agent to form an unbonded assembly;
  subjecting the unbonded assembly to an initial compaction at a pressure of at least 4.5 GPa and a temperature below the melting point of the bonding agent for a period of at least 150 seconds; and thereafter
  subjecting the unbonded assembly to a temperature above the melting point of the bonding agent and a pressure of at least 4.5 GPa for a time sufficient for the bonding agent to become molten and bond the PCD table to the substrate to form a composite diamond compact.

The method of the invention provides a method of bonding or attaching a PCD table or body to a cemented carbide substrate which has as an essential step an initial compaction at a temperature below the melting point of the bonding agent. This initial compaction may include the use of so-called cold or hot compaction methods or preferably both hot and cold compaction methods.

Where cold compaction is used, pressures of between 4.5 GPa and 5.5 GPa are generally applied to the PCD table, in the absence of any heat i.e. at or about ambient temperature, for a period of at least 150 seconds, more preferably greater than 200 seconds.

Where hot compaction is used, the PCD table is subjected to a temperature above ambient temperature, preferably in excess of 900° C., for a period of at least 150 seconds.

The bonding agent may be a metal and may include cobalt, aluminium, silver, copper, silicon or alloys thereof. The source of the bonding agent may be the cemented carbide substrate or a shim or layer of bonding agent provided between the PCD table and the cemented carbide substrate.

The PCD table or body will be a sintered material produced by methods known in the art. It will contain diamond-to-diamond bonding and a porous microstructure. The pores of the porous microstructure may contain a second phase material such as solvent/catalyst.

The shape of the PCD table or body may be any suitable shape and will depend on the nature and type of product to be produced. The shape will typically be disc-shaped.

The invention has particular application to PCD tables in which the pores of the porous microstructure are empty and substantially free of second phase material. For such PCD tables, molten bonding agent will infiltrate the empty pores during the bonding step. The infiltration of bonding agent may extend through the entire porous microstructure or through a portion only of the porous microstructure, e.g. the region close to the interface between the PCD table and the cemented carbide substrate.

For PCD tables where the pores of the porous microstructure contain a second phase material there will be some penetration or infiltration of molten bonding agent into the PCD microstructure and mixing with the second phase material.

In producing a PCD table by sintering under HpHT conditions a traditional metallic diamond solvent/catalyst, such as cobalt, iron, nickel or alloys thereof, is typically used. This metal catalyst may be introduced via admixing of the metal powder with the unsintered diamond crystals or sourced by infiltration during sintering, from an adjacent carbide substrate; or by a combination of these methods. Such PCD is used in the oil and gas drilling industry.

Where the PCD table is prepared by first forming a PCD layer bonded to a cemented carbide substrate, the formed PCD layer is then removed from the cemented carbide substrate using techniques known in the art.

The formed PCD table may be subjected to leaching where all or the majority of the solvent/catalyst binder is removed. The resultant PCD leached table has a porous microstructure.

In the practice of one form of the present invention it is preferable to leach the PCD table in such a manner as to remove the solvent/catalyst binder material as fully as possible. It is, however, anticipated that a certain amount of residual catalyst/solvent material may persist, either adhering to surfaces within the leached voids, or bound up within the PCD structure, particularly of the central volume of the layer, where leaching methods are not able to remove it effectively.

The PCD table is subjected to a modified HpHT treatment in the bonding step to attach the PCD table to a cemented tungsten carbide substrate. It is carried out by a process in which increased time intervals of cold compaction and hot compaction of the PCD may be used such that there is an increased time for particle rearrangement during plastic deformation to produce a product having a higher diamond contiguity and density. The method of the invention therefore leads to change in the PCD microstructure after the modified HpHT process to produce a product having better abrasion and thermal resistance. This is particular so when the PCD table has a porous microstructure substantially free of second phase material.

The unsintered diamond particles used to produce the starting PCD table may be monomodal, i.e. the diamond will be of a single average particle size or multimodal, i.e. the diamond will comprise a mixture of particles of more than one average particle size.

The PCD material of the invention in the forming phase preferably takes the form of a PCD table bonded to a surface of a cemented carbide substrate, forming a composite diamond compact. The source of the solvent/catalyst will typically be, at least in part, from the carbide substrate. The carbide is preferably in the form of tungsten carbide which is the source of the solvent/catalyst for the starting PCD compact. As is known in the art, the presence of solvent/catalyst in the process of producing the starting PCD compact effects bond formation between diamond particles resulting in a dense intergrown PCD structure, which is typically 85 to 95% diamond by volume.

When attaching or bonding the PCD table to the substrate, the bonding agent is used to form or facilitate the bond between the PCD table and the cemented carbide substrate. It is not therefore required that it be a solvent/catalyst metal.

During cold compaction in the initial compaction step the PCD undergoes elastic consolidation as a result of applied pressure without increased temperature. Plastic deformation takes place during hot compaction prior to the bonding agent melting. These compaction mechanisms facilitate further densification of the PCD structure, reducing the volume of the open pores, and hence the volume of re-infiltrating material that subsequently infiltrates and fills the pores. The improvement in the abrasion and thermal resistance is therefore attributed to improved diamond packing and contact. The densification of the PCD structure is particularly apparent when the pores of the porous microstructure of the PCD table are empty, i.e. substantially free of second phase material.

BRIEF DESCRIPTION OF THE DRAWINGS

The invention will now be described in more detail, by way of example only, with reference to the accompanying figures in which.

DETAILED DESCRIPTION OF PREFERRED EMBODIMENTS

This invention concerns a method of producing a composite PCD compact in which the PCD may have improved wear resistance and thermal stability.

In accordance with the method of the invention, a sintered PCD table having diamond-to-diamond bonding and a porous microstructure is provided. Although PCD table may be provided in any appropriate manner, it is typically provided in a first stage of a multi stage synthesis process. The PCD table is typically formed in the presence of conventional diamond solvent/catalysts according to standard methods, that is under HpHT conditions to produce a sintered PCD table. This is typically a backed PCD compact i.e. a PCD table with a cemented carbide substrate. If the sintered PCD table is backed by a carbide substrate, then the PCD table will subsequently be detached from the carbide substrate by EDM cutting, lapping or grinding of the carbide or any similar technique known in the art.

The diamond solvent/catalyst used to produce the standard PCD table can be introduced into the unsintered diamond powder (i.e. the green state product) prior to sintering and/or can be introduced via infiltration from the carbide substrate during sintering. Various methods of introduction of the solvent/catalyst well known in the art, such as mechanical mixing and milling methods including ball milling (wet and dry), shaker milling and attritor milling, would be suitable for introducing the catalyst/solvent into the unsintered diamond powder. If in powder form, the particle size of such solvent/catalyst material is preferably comparable to the particle size of the unsintered diamond grains. It is even more preferable that the catalyst be finer in size than the diamond grains.

The HpHT conditions used for producing the formed, sintered PCD table will typically be determined by the nature of the solvent/catalyst. These are well known to those skilled in the art. Where the solvent/catalyst is a traditional transition metal element or alloy, then these conditions are typically between 1300° C. and 1550° C. and 5 and 6 GPa. Other known metallic-based and non-metallic solvent/catalyst systems are also suitable for producing a sintered PCD table. It is important that the PCD has an intergrown character.

The solvent/catalyst is preferably removed from the formed PCD table using various leaching technologies known in the art, such as electrolytic etching, acid leaching and evaporation techniques. Where the solvent/catalyst material is a transition metal or alloy thereof, it is typically removed by acid leaching.

Figure 1:
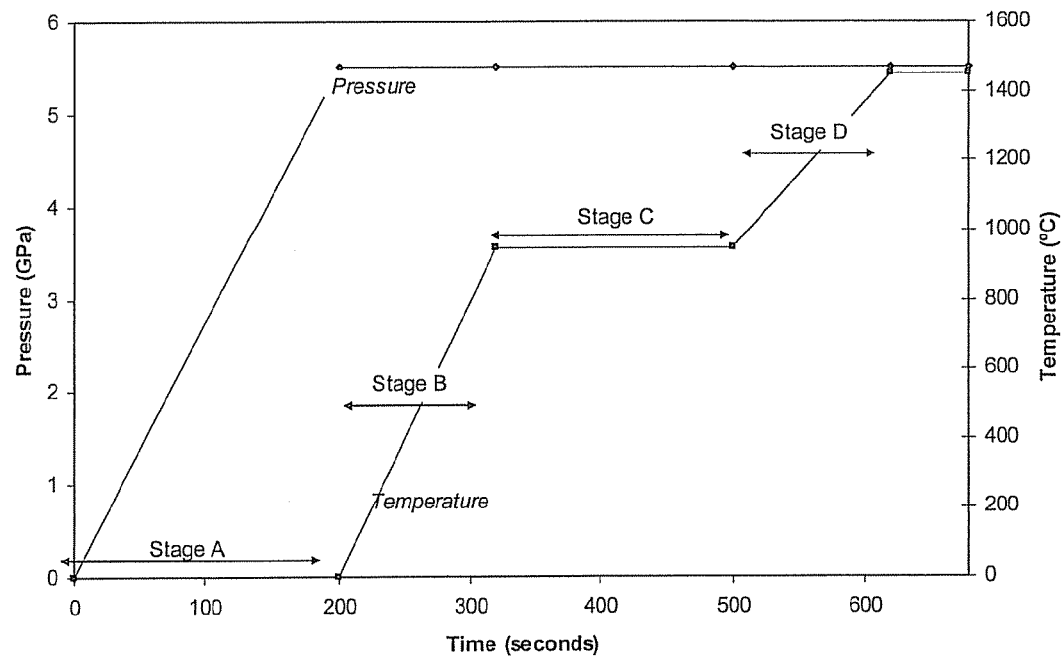
FIG. 1 shows a portion of a pressure, temperature cycle for the HpHT attachment process of a preferred embodiment of the invention.

Having provided a PCD table that is preferably porous, given the substantial removal of the catalyst/solvent material, it is then attached by bonding to a supporting substrate, preferably of tungsten carbide, in a preferred embodiment of the HpHT process of the invention, as depicted in accompanying FIG. 1.

An important aspect of the invention in achieving a successful attachment is the presence of a suitable bonding agent, which is molten during the later part of the attachment method. This bonding agent allows the PCD layer to be well bonded to the cemented carbide substrate after the HpHT treatment, and will typically at least partially infiltrate the leached PCD, particularly when the porous microstructure is substantially free of second phase material. In the absence of a deliberately introduced infiltrating agent, the cementing metal of the carbide substrate, for example, cobalt, is suitable. Other metals such as aluminium, silver, copper, silicon or alloys thereof are also suitable and can be introduced at the PCD layer-carbide interface in the form of a shim or powder layer. The bonding agent can also be introduced from the top surface of the PCD table, where the pores of the porous microstructure are substantially free of second phase material, and penetrate through the PCD table in order to bond the substrate to this table.

In an embodiment of the invention and referring to the pressure/temperature cycle of FIG. 1, a leached PCD table is first subjected to a 'cold compaction' step i.e. the application of load or pressure without the simultaneous application of temperature (see stage A). It is believed that this period of cold compaction leads to the cold elastic consolidation of the PCD table leading to increased density of the PCD. This cold compaction step typically includes the process of achieving a peak or maximum pressure of between 4.5 GPa and 5.5 GPa over a period of at least 150 seconds, more preferably greater than 200 seconds. An important feature of this stage in the pressure cycle is therefore that the load required to obtain maximum or peak pressure is typically largely attained prior to the application of temperature. This ensures that a maximum degree of cold compaction is experienced by the PCD. It is anticipated that further internal pressure is generated after application of the heat due to thermal amplification effects, but this is largely the result of the internal heating process rather than the deliberate application of external load.

Referring to the temperature trajectory of FIG. 1, subsequent to the cold compaction stage, the PCD table is then subjected to a 'hot compaction' step i.e. the application of temperature whilst at pressure (see stage B). With the external application of heat, the temperature is raised from ambient up to at least 900° C., more preferably at least 950° C., but below the melting point of the bonding agent, over a period of between 70 to 150 seconds, and more preferably 120 seconds. During this hot compaction step, the PCD plastically deforms, and it is hypothesised that the inter-particle bonding of the PCD is further enhanced even in the absence of a solvent/catalyst phase. This plastic deformation stage, occurring in the absence of molten bonding phase, is then typically maintained for a period of about 150 to 250 seconds, preferably 180 seconds (see stage C).

The temperature is then further increased to above the melting point of the bonding agent to provide the molten bonding agent, which temperature typically peaks at a temperature of between 1350° C. and 1500° C. over a period of between 100 and 200 seconds, preferably 120 seconds (see stage D). The temperature may be increased step-wise to the peak temperature in order to effect sufficient plastic deformation of the PCD without causing property deterioration of the PCD, which can happen at elevated temperatures.

Once the temperature has reached the melting point of the bonding agent, then this will melt and typically penetrate at least partially into the PCD table. Subsequent pressure and temperature conditions are then maintained in order to achieve effective bonding between the PCD and substrate layers. During this attachment step, process pressures can typically be lowered by between 0.5 GPa and 1 GPa compared to those used for standard sintering of PCD (as was used in the first step of the method of the invention). This can be significant in improving the life of the HpHT apparatus. Once optimal bonding has been achieved, the pressure and temperature conditions are reduced back to ambient conditions as appropriate for the apparatus and conditions used and as would be known to those skilled in the art.

The cold elastic consolidation due to cold compaction and plastic deformation during hot compaction, results in an improved structure of the attached PCD compact when compared to the structure of the standard PCD compact. The attached PCD compact will therefore have improved wear resistance and thermal stability.

Microstructural images captured with a scanning electron microscope (SEM) were used to compare the structures of the initial formed standard PCD tables with those obtained after the re-attachment process. SEM images were also used to conduct quantified image analysis of the PCD microstructures to obtain a measure of the overall diamond density (calculated from the area fraction of each image that contains diamond) and of diamond contiguity. Diamond contiguity is a measure of the degree of diamond-to-diamond inter-particle bonding within the PCD microstructure and is obtained using conventional image analysis algorithms.

Property and mechanical behaviour advantages, such as improved wear resistance and improved thermal stability of the reattached PCD compact of the invention, were observed using application-based testing such as granite turning tests (used as a measure of the wear resistance) and milling tests (used as an indicator of thermal stability).

The invention is further described by the following non-limiting example.

EXAMPLE

A sintered PCD table was first formed using a conventional HpHT cycle according to methods well known in the art. A multimodal diamond powder mixture backed with a cemented tungsten carbide substrate was assembled and treated in a vacuum furnace to remove any impurities. This green state product was then subjected to HpHT sintering conditions to produce a standard compact comprising a PCD table bonded to a cemented carbide substrate. A control sample of backed PCD generated using this method was set aside for comparative purposes. The microstructure of this comparative sample was investigated using SEM.

SEM analysis of the comparative formed PCD (FIGS. 2A and 3A) clearly shows the presence of diamond intergrowth within this PCD table. The dark regions in the micrograph represent the diamond phase, the grey regions represent the binder/catalyst cobalt and the lighter regions represent the tungsten carbide phases. The grey and lighter regions represent the second phase and are interspersed through the diamond phase.

The PCD table formed by this standard method was then removed from the carbide substrate using EDM grinding until a sintered PCD table with a thickness of 2.0-2.2 mm remained.

This PCD table was then acid-treated in $HF/HNO_3$ to remove the Co catalyst and WC in the pores of the bonded diamond structure and thoroughly cleaned to remove any contaminants left in the pores.

This leached, formed PCD table was then backed with a tungsten carbide substrate and subjected to an HpHT cycle with an initial pressure and temperature cycle as shown in FIG. 1. The remainder of the pressure and temperature treatment were typical of conventional PCD HpHT sintering cycles. A re-attached PCD compact with the PCD layer well-bonded to the tungsten carbide substrate through the bonding action of the molten cobalt infiltrant (sourced from the cemented carbide substrate) was obtained.

Figure 2:
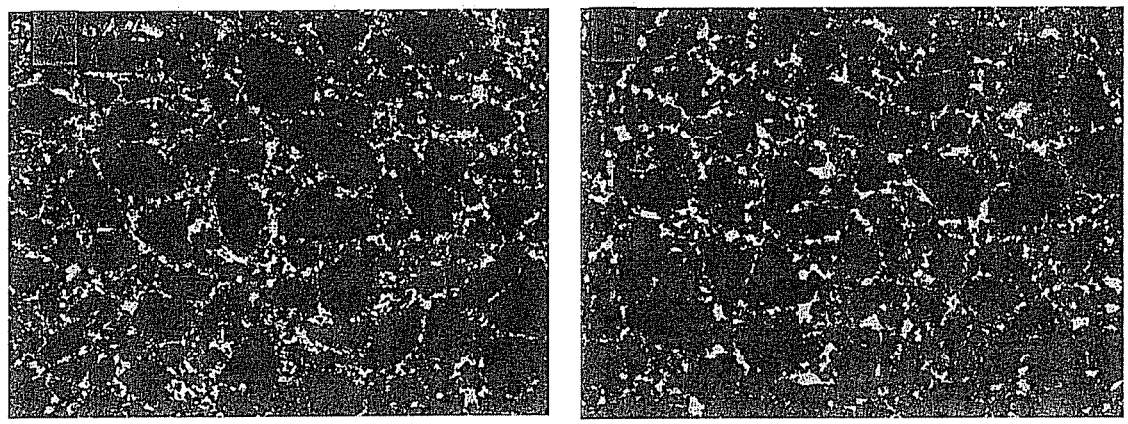
FIG. 2A shows a low magnification SEM image of PCD material prior to undergoing the HpHT attachment process of a preferred embodiment of the invention.
FIG. 2B shows a low magnification SEM image of PCD material after undergoing the HpHT attachment process of a preferred embodiment of the invention.
Figure 3:
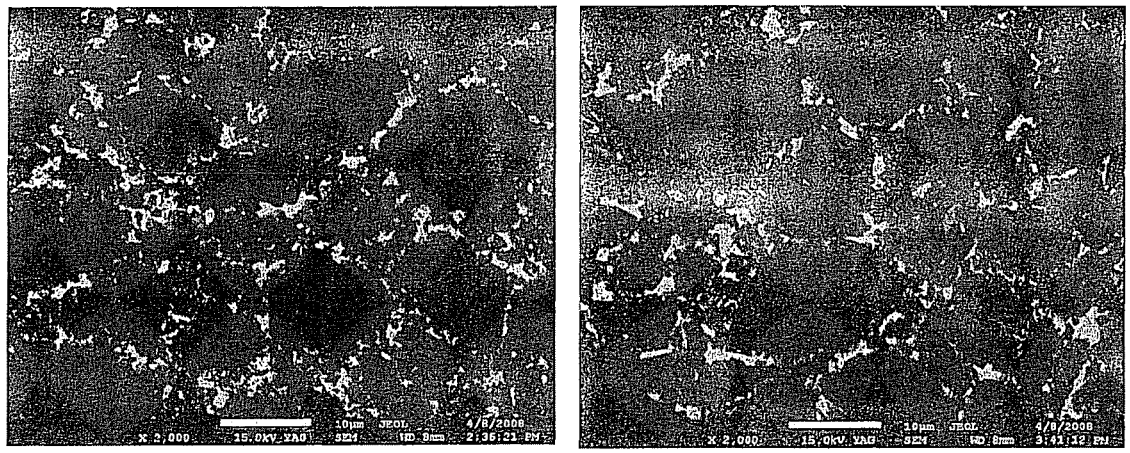
FIG. 3A shows a higher magnification SEM image of the PCD material of FIG. 2A.
FIG. 3B shows a higher magnification SEM image of the PCD material of FIG. 2B.
Figure 4A:
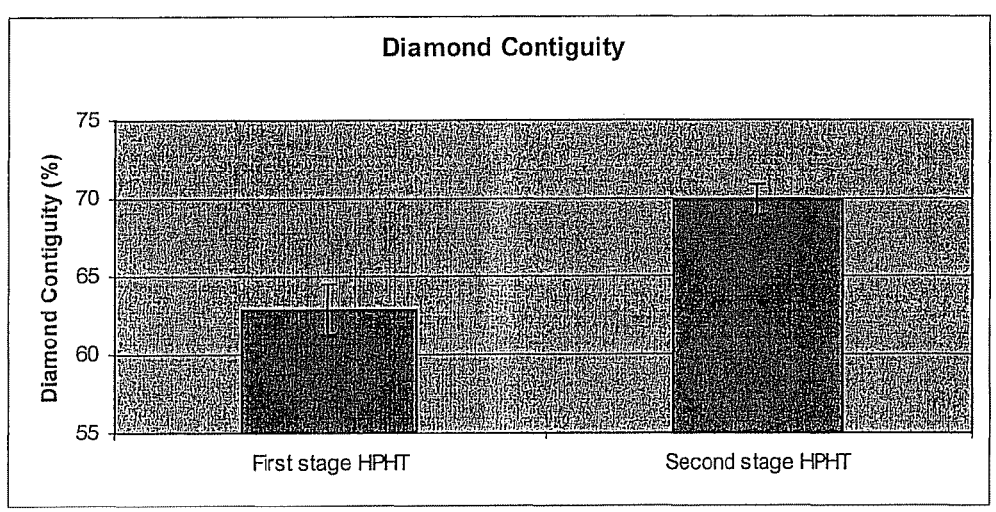
FIG. 4A shows a graph of comparative diamond contiguity of a PCD table prior to and after undergoing the HpHT attachment process of a preferred embodiment of the invention.

SEM analysis of the resultant re-attached compact (FIGS. 2B and 3B) shows that the intergrown PCD structure is maintained. It is noticeable, however, that the metal binder pools of the re-attached PCD microstructure appear to have a reduced presence of fine diamond particles when compared to the initial formed PCD table (FIGS. 2A and 3A). This has been ascribed to particle consolidation and rearrangement as a result of the increased cold compaction and plastic deformation of the second HpHT cycle treatment. Results from quantitative image analysis comparisons are shown in FIG. 4.

Figure 4B:
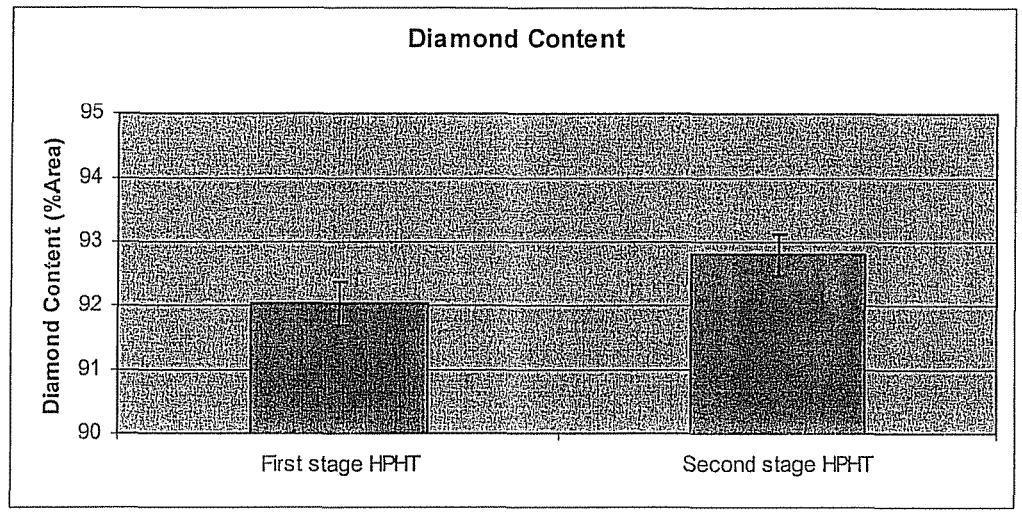
FIG. 4B shows a graph of comparative diamond content of a PCD table prior to and after undergoing the HpHT attachment process of a preferred embodiment of the invention

It is evident that the second HpHT treatment has a significant effect on the microstructure of the PCD. The overall diamond content of the re-attached PCD appears higher than that of the initial formed PCD compact, as shown in FIG. 4B. Additionally, the area of contact or contiguity between adjacent diamond grains increased as shown by the diamond contiguity graph in FIG. 4A. This structural improvement has been ascribed to both cold elastic consolidation and plastic deformation (as described above).

Figure 5:
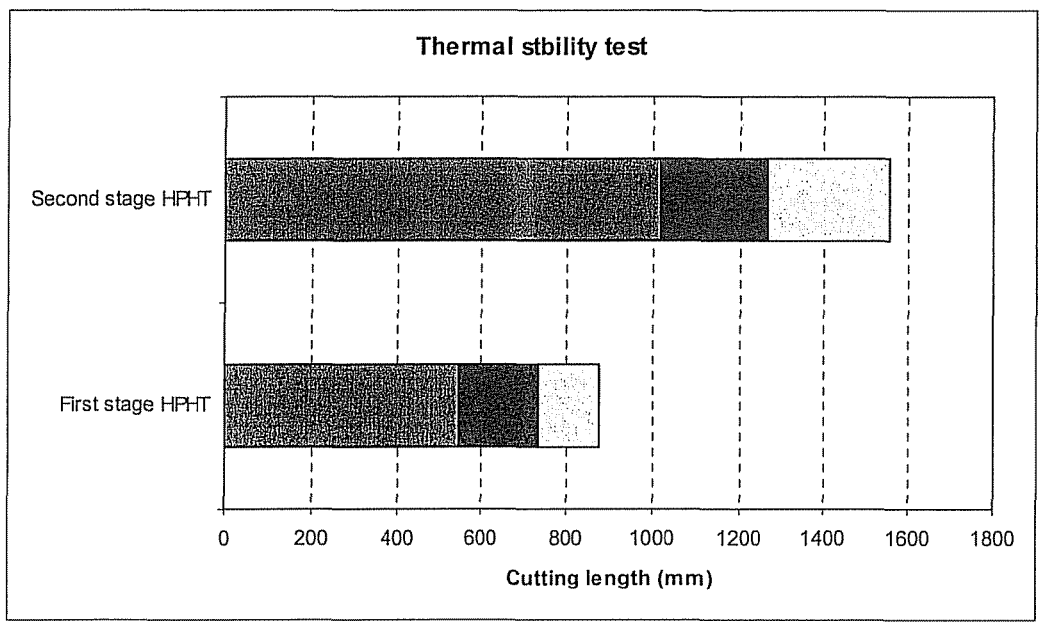
FIG. 5 shows a graph of comparative granite milling results of a PCD table prior to and after undergoing the HpHT attachment process of a preferred embodiment of the invention, indicating thermal stability.

Both PCD compacts (standard formed and re-attached) were then subjected to a granite milling test as an indicator of thermal stability. In this test, the longer the cutting length, the better or more thermally stable is the material. This test clearly shows an improvement in thermal stability of the re-attached PCD compact. Results are shown graphically in FIG. 5.

Figure 6:
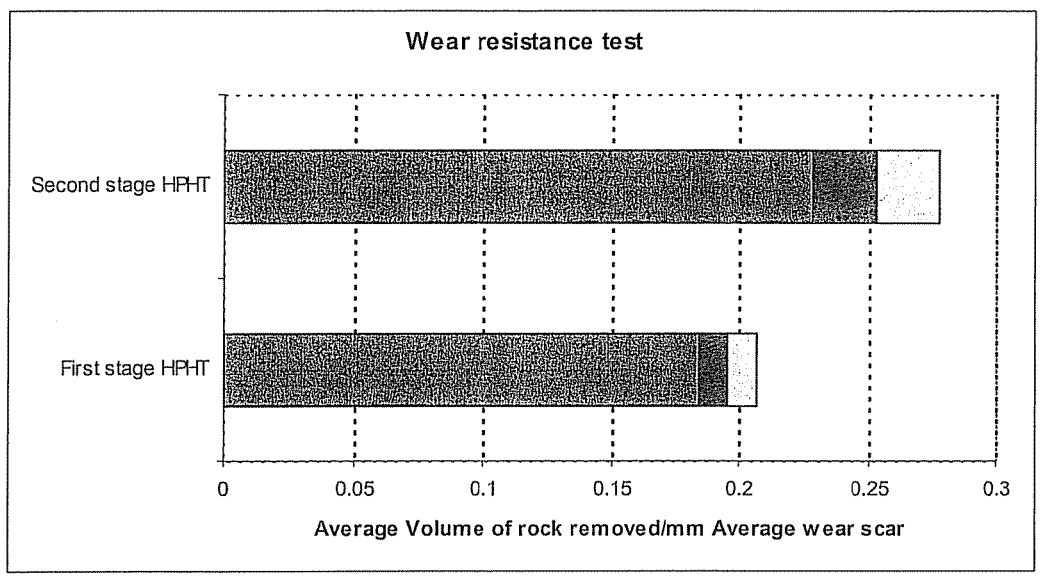
FIG. 6 shows a graph of comparative results of a granite turning test of a PCD table prior to and after undergoing the HpHT attachment process of a preferred embodiment of the invention, indicating abrasion resistance.

Comparisons between the compacts were conducted in an applications-based abrasion resistance test. The re-attached PCD compact shows superior abrasion resistance to the standard PCD compact, as can be seen graphically in FIG. 6.

The invention claimed is:

1. A method of producing a composite diamond compact comprising a polycrystalline diamond (PCD) compact bonded to a cemented carbide substrate including the steps of:
   providing a PCD table
   bringing together the PCD table and a cemented carbide substrate in the presence of a bonding agent to form an unbonded assembly;
   subjecting the unbonded assembly to an initial compaction at a pressure of at least 4.5 GPa and a temperature below the melting point of the bonding agent for a period of at least 150 seconds; and thereafter
   subjecting the unbonded assembly to a temperature above the melting point of the bonding agent and a pressure of at least 4.5 GPa for a time sufficient for the bonding agent to become molten and bond the PCD table to the substrate to form a composite diamond compact.

2. A method according to claim 1 wherein the PCD table has diamond-to-diamond bonding and a porous microstructure and a second phase material in the pores of the porous microstructure.

3. A method according to claim 2 wherein the second phase material is solvent/catalyst.

4. A method according to claim 1 wherein the pores of the porous microstructure are free of second phase material.

5. The method according to claim 1, wherein the temperature of the initial compaction is at or about ambient temperature.

6. The method according to claim 1, wherein the temperature of the initial compaction is above ambient temperature.

7. The method according to claim 1, wherein the temperature of the initial compaction is at or near ambient temperature for a portion of the period and above ambient temperature for the remaining portion of the period.

8. The method according to claim 1, wherein the temperature of the initial compaction is maintained for a period of at least 200 seconds.

9. The method according to claim 5 wherein pressure is between 4.5 GPa and 5.5 GPa in the initial compaction.

10. The method according to claim 1 wherein the source of the bonding agent is the cemented carbide substrate.

11. The method according to claim 1 wherein the bonding agent is provided as a shim or layer between the PCD table and the cemented carbide substrate.

12. The method according to claim 1, wherein the bonding agent is selected from cobalt, aluminium, silver, copper, silicon and alloys thereof.

* * * * *